United States Patent [19]

Knothe et al.

[11] 4,276,949

[45] Jul. 7, 1981

[54] ELECTROMAGNETIC FORCE-COMPENSATING WEIGHING APPLIANCE

[75] Inventors: Erich Knothe, Bovenden; Christoph Berg, Adelebsen; Franz J. Melcher, Hardegsen, all of Fed. Rep. of Germany

[73] Assignee: Sartorius GmbH, Göttingen, Fed. Rep. of Germany

[21] Appl. No.: 100,036

[22] Filed: Dec. 4, 1979

[30] Foreign Application Priority Data

Dec. 8, 1978 [DE] Fed. Rep. of Germany ....... 2853073

[51] Int. Cl.³ .......................... G01G 7/00; G01G 3/14
[52] U.S. Cl. ............................. 177/212; 177/210 EM
[58] Field of Search ......... 177/210 EM, 212, 256–259

[56] References Cited

U.S. PATENT DOCUMENTS

| | | | |
|---|---|---|---|
| 4,062,416 | 12/1977 | Berg et al. | 177/210 EM |
| 4,090,575 | 5/1978 | Kunz et al. | 177/210 EM |
| 4,148,370 | 4/1979 | Luchinger | 177/210 EM |
| 4,153,124 | 5/1979 | Knothe et al. | 177/210 EM |
| 4,153,126 | 5/1979 | Knothe et al. | 177/212 X |
| 4,184,556 | 1/1980 | Kunz | 177/212 EM |

FOREIGN PATENT DOCUMENTS

170608 8/1951 Austria .................................. 177/257

Primary Examiner—George H. Miller, Jr.
Attorney, Agent, or Firm—Otto John Munz

[57] ABSTRACT

An electromagnetic force-compensating weighing appliance has at least two levers engaged at one of their ends in supporting relationship to a load scale, and each connected at their other ends to a respective compensating coil, the compensating coils being symmetrically disposed in the air gap of a single magnet unit, and the levers being pivotally supported between their ends on fixed supports.

9 Claims, 5 Drawing Figures

ELECTROMAGNETIC FORCE-COMPENSATING WEIGHING APPLIANCE

BACKGROUND OF THE INVENTION

1. Field of the Invention

The invention relates to an electromagnetically force-compensating weighing appliance with a load scale supported by at least two levers.

2. Prior Art

In weighers of this kind, the loading scale transfers the load to the levers, in which process the distribution to the individual levers depends on the position of the load on the load scale. The shares of the individual levers are then mechanically added by coupling members and fed to a measuring element. This measuring element may be, for example, a current-carrying coil which, in cooperation with a stationary permanent magnet unit, produces a load-proportional counterforce, according to the known principle of electromagnetic force-compensation. This construction entails the disadvantage that the lever ratio of each individual lever must be mechanically set and fixed by change in distance of the moving joints, in order to avoid corner load errors. Besides, the coupling members between the levers for adding the forces limit the accuracy of the weighing appliance, since these coupling members, at load or temperature dependent movements of the individual levers relative to each other in vertical or horizontal direction result in additional forces which adulterate the weighing result.

SUMMARY OF THE INVENTION

The purpose of the invention is, therefore, to improve an electromagnetically force-compensating weighing appliance with a load scale supported by at least two levers, in such a way that the weighing appliance permits a simplified corner load adjustment, and also improves the accuracy of such a scale.

According to the invention, this is accomplished by a device wherein each lever bears a compensation coil which is immersed in an air gap of a single stationary magnet unit and coacts therewith.

Due to the fact that at each lever the counterforce is directly produced via the compensation coil, no mechanical coupling whatever between the individual levers is required. The compensating coils are advantageously arranged concentrically in the air gap of the magnet unit symmetrical with respect to rotation, and do not come in contact with each other or the magnet unit. The adjustment of the lever ratio can be readily carried out by analog or digital electronic means, without mechanical engagement. The use of a single magnet keeps the expense and the weight of the weighing appliance down and avoids corner load errors by different aging and variation of temperature of several magnets.

As a lever arrangement for the weighing appliance of the invention, advantageously two V-shaped or Y-shaped levers are employed, or one V-shaped or Y-shaped and one I-shaped lever, or three I-shaped levers.

BRIEF DESCRIPTION OF THE DRAWINGS

The invention is explained in greater detail in the following with the aid of the diagrammatical figures, in which.

DETAILED DESCRIPTION OF THE PREFERRED EMBODIMENTS

Figure 1:
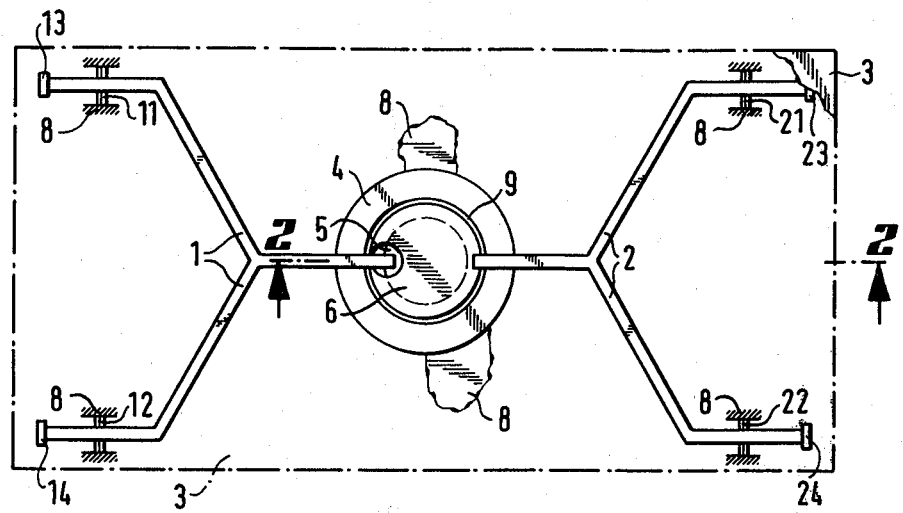
FIG. 1 is a plan view upon a first embodiment, with two Y-shaped levers with indicated load scale.
Figure 2:
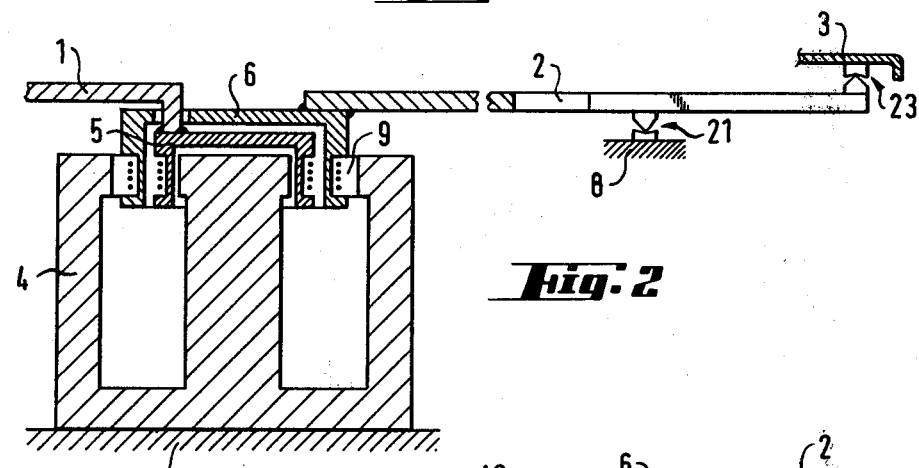
FIG. 2 is a cross section of a magnet arrangement for FIG. 1, along line 2—2 in FIG. 1, on a larger scale.

FIG. 1 shows diagrammatically a weighing appliance with a load scale 3 supported by two Y-shaped levers 1 and 2. The support points on lever 1 are marked 13 and 14, while the support points on lever 2 are marked 23 and 24. Lever 1 is supported, with joints 11 and 12, at fixed points 8 at the casing (not shown). Likewise, lever 2 is supported with joints 21 and 22. Joints 11, 12, 21 and 22 can in this structure comprise conventional means such as blades and cups or resilient elements in the form of bands or cross bands. Lever 2 bears at its free end a compensating coil 6 which protrudes into the air gap of a permanent magnet unit 4. Likewise, lever 1 bears at its free end a compensating coil 5 which protrudes, concentrically to compensating coil 6, likewise into the air gap of permanent unit 4 (FIG. 2). Both compensating coils 5 and 6 are positioned at a short distance from each other and from the stationary permanent magnet unit, so that they do not come in contact with each other when the slight vertical and horizontal movements, depending on load and temperature, of levers 1 and 2 take place. Each compensating coil 5, 6 is a constituent of an electric automatic control circuit which in a known manner compensates for the force transferred by the associated lever 1 or 2 and thus retains the lever in its zero position. Since the magnitude of the force transferred by the individual lever 1 or 2 depends on the position of the load in the load scale, the counterforce produced by the current in each compensating coil 5 or 6 depends also on the position of the load on load scale 3. Only the sum of the two currents in the compensating coils 5 and 6 results in the load-proportional measuring signal. In this electric addition, unevenness in the lever ratio of levers 1 and 2 can be readily compensated for, in which operation it is irrelevant whether this unevenness originates from manufacturing tolerances or has been intentionally produced for certain constructive reasons. The electric adjustment of the lever ratio can be made in a known manner, for example, analog-electrically by current dividers or digital-electrically by valuation factors.

Figure 3:
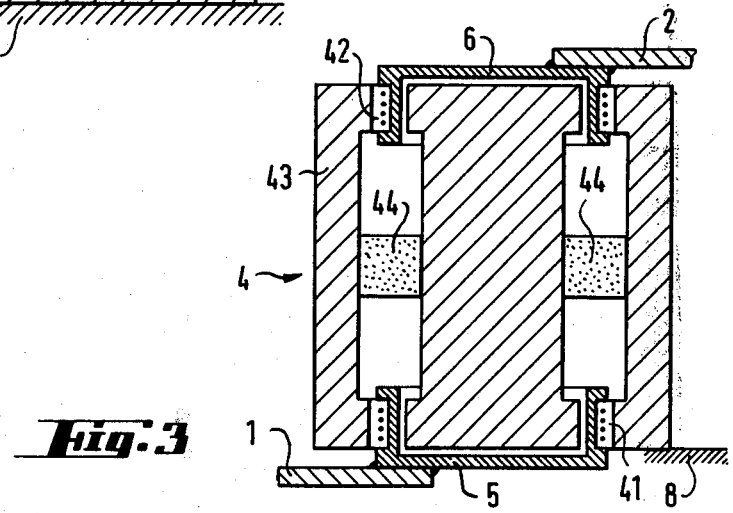
FIG. 3 is a cross section of another magnet arrangement for FIG. 1.

FIG. 3 shows another form of the magnet arrangement 4 for the embodiment of the weighing appliance according to FIG. 1. This magnet arrangement is provided with two air gaps 41 and 42 which are series-connected magnetically. The cylindrical magnetic return path 43 of the magnetic circuit is in this structure held by a spacer ring or several spacers 44 of non-magnetic material. Compensating coil 5 is immersed into air gap 41, and compensating coil 6 into air gap 42. In comparison with the embodiment shown in FIG. 2, this embodiment excels by an easier assembly of compensating coils 5 and 6, while operating in the same manner.

Figure 4:
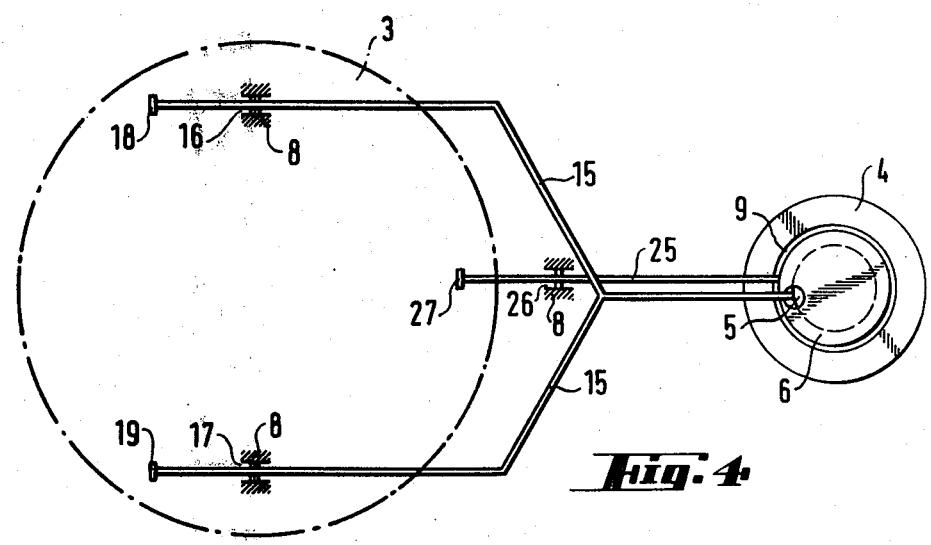
FIG. 4 is a plan view upon another embodiment with a Y-shaped lever and a I-shaped lever.

Another embodiment of the weighing appliance of the invention is shown in FIG. 4. The round load scale 3 is here supported at points 18 and 19 by a Y-shaped lever 15 and at a point 27 by an I-shaped lever 25. Compensating coil 5 is fastened on lever 15, compensating coil 6 on lever 25. Both compensating coils 5 and 6 protrude into the air gap of magnet unit 4 which is structured according to FIG. 2 but may also be constructed according to FIG. 3. The lever ratio of the two levers 15 and 25 may differ. For example, the distance between moving joints 26 and 27 can be chosen so as to equal the distance between moving joints 16 and 18, or 17 and 19, and the correct evaluation of the currents in compensating coils 5 and 6 can take place electrically in the manner described above. By this fact the constructive possibilities are substantially extended with respect to the customary mechanical addition of the partial forces via coupling members, with the equality—necessary in this case—of the lever conditions.

Figure 5:
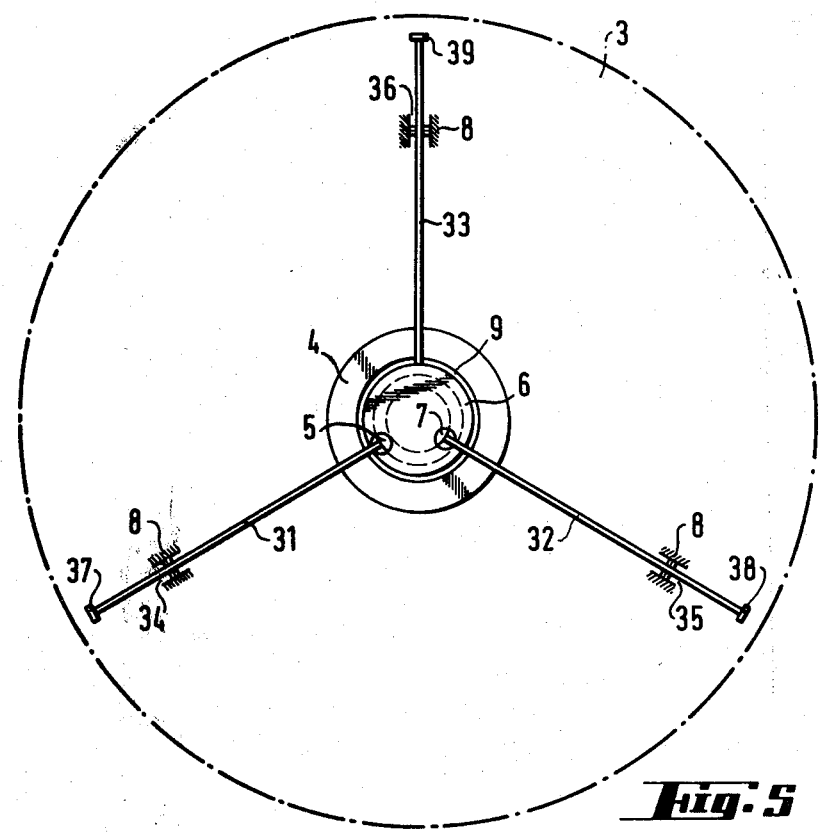
FIG. 5 is a plan view upon a further embodiment, with three I-shaped levers.

A further embodiment with three I-shaped levers 31, 32 and 33 is shown in FIG. 5. Load scale 3 is supported at the points 37, 38 and 39 by these levers. The levers are connected at points 34, 35 and 36 individually and flexibly with fixed points of the casing and bear at their free ends each a compensating coil 5 and 6 and 7. The three compensating coils are immersed concentrically into the air gap of magnet arrangement 4. Due to the employment of the three I-shaped levers together with the electric evaluation and addition of the partial currents in the three compensating coils, the mechanical adjustment of the lever ratios, as well as the adjustment of the parallelism of the moving joints on the Y-shaped levers is eliminated. Due to the very symmetrical structure and the free mobility of the three compensating coils relative to each other, this arrangement is also largely insensitive to temperature changes and temperature gradients.

We claim:

1. An electro-magnetic force-compensating weighing appliance comprising:
    a load scale;
    at least two levers having opposite ends and extending at one of their respective ends in supporting relationship with opposite portions of the load scale;
    said levers being pivotally supported between their ends;
    stationary magnet means having an air gap;
    each lever bearing a compensating coil at their respective other ends and said compensating coils being immersed in the magnet means air gap to interact therewith, whereby the location of the load on the load scale determines the proportion each coil contributes to the counter force produced and the sum of the force compensation effected by the coils provides a load-proportional measuring signal, thus eliminating the need for mechanical coupling between the levers.

2. A weighing appliance as claimed in claim 1, the magnet unit being provided with two axially superposed air gaps into each of which a compensating coil protrudes.

3. A weighing appliance as claimed in claim 1, wherein:
    the levers comprise two Y-shaped levers;
    the load scale being supported by said two Y-shaped levers.

4. A weighing appliance as claimed in claim 1, wherein:
    the levers comprise a V-shaped lever and an I-shaped lever;
    the load scale being supported by said V-shaped lever and said I-shaped lever.

5. A weighing appliance as claimed in claim 1, wherein:
    the levers comprise three I-shaped levers;
    the load scale being supported by said three I-shaped levers.

6. An electromagnetic force-compensating weighing appliance as claimed in claim 1, wherein:
    said compensation coils are symmetrically arranged in said air gap of said single magnet unit; and
    said levers are pivotally supported between their ends on a fixed support.

7. A weighing appliance as claimed in claim 1,
    the magnet unit being constructed symmetrically with respect to rotation; and
    the compensating coils being arranged concentrically to the axis of symmetry of the magnet unit.

8. A weighing appliance as claimed in claim 7, the magnet unit being provided with two axially superposed air gaps into each of which a compensating coil protrudes.

9. A weighing appliance as claimed in claim 8, wherein:
    the levers comprise two Y-shaped levers;
    the load scale being supported by said two Y-shaped levers.

* * * * *